UNITED STATES PATENT OFFICE.

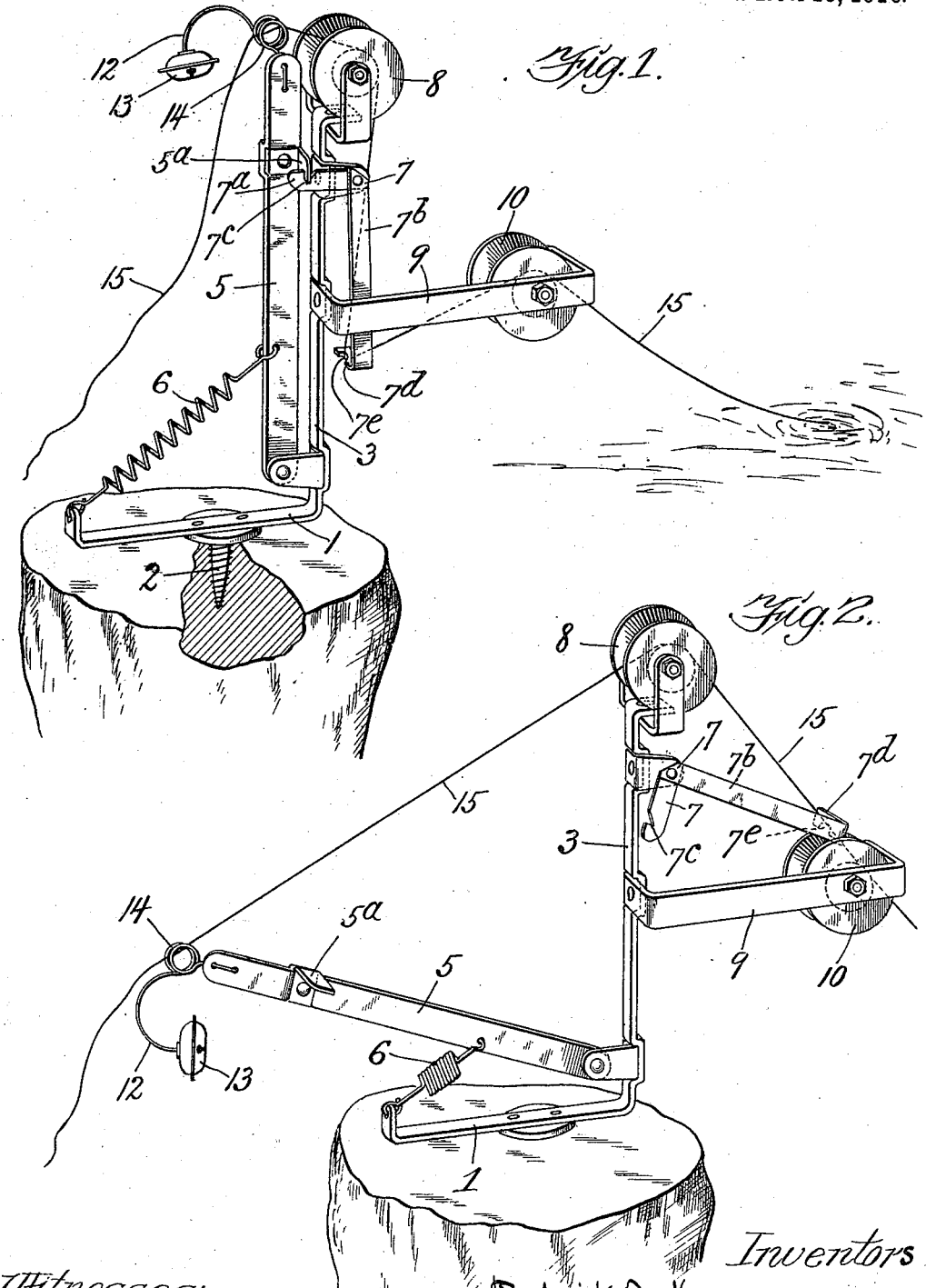

FREDERICK BECKER AND JOHN E. POGGENSEE, OF CHICAGO, ILLINOIS.

AUTOMATIC FISH-CATCHING DEVICE.

975,822. Specification of Letters Patent. Patented Nov. 15, 1910.

Application filed October 20, 1909. Serial No. 523,559.

*To all whom it may concern:*

Be it known that we, FREDERICK BECKER and JOHN E. POGGENSEE, citizens of the United States, both residing at Chicago, in the county of Cook and State of Illinois, have invented new and useful Improvements in Automatic Fish-Catching Devices, of which the following is a specification, reference being had to the accompanying drawings, forming a part thereof.

This invention relates to devices for automatically operating a fishing line to give the same an abrupt pull when the hook, or bait, is grasped by the fish.

It consists in the features of construction and their combinations shown and described as indicated in the claims.

In the drawings:—Figure 1 is a perspective view of a device embodying this invention, parts being shown set ready for operation. Fig. 2 is a similar view, showing the parts in position after operating to jerk the line.

The device is designed to be mounted upon any convenient object on the bank or shore of the body of water in which the fishing is done, any suitable fixed object into which a tang can be driven, as the stump or limb of a tree, plank or block, heavy enough, or sufficiently fixed in position to hold the line against the ordinary pull to which it may be subjected, being suitable for so mounting it; and for this purpose it comprises a standard, 1, having a screw tang, 2, projecting from its lower side for screwing into any such suitably fixed object. The standard, 1, is designed to be made out of a strip or bar of metal folded at a right angle, the horizontal limb having the screw tang mentioned projecting downward from it, and the vertical limb, 3, serving to support the operating devices. These operating devices comprise a lever, 5, pivoted at one end to the standard, near the right angle, extending off overhanging the horizontal member of the standard, to which it is connected by an extensible spring, 6, adapted by its normal contraction to draw and hold the lever down toward the horizontal member of the standard, but to yield to permit it to be erected to vertical position.

On the standard, near the upper end, there is pivoted a latch, which is in the form of a bell-crank lever, 7, having its shorter member, 7ª, constituting the latch proper, notched on its upper edge to engage a detent lug, 5ª, which juts off from the lever, 5, for such engagement. The longer arm, 7ᵇ, of crank lever, depends in substantially vertical position when the detent, 5ª, is engaged with the notch on the latch arm, 7ª, and the said notch, 7ᶜ, has its abrupt engaging shoulder positioned so that the stress of the detent lug against it when parts are engaged is nearly enough in horizontal line with the fulcrum of the bell-crank lever to hold such depending arm approximately vertical. Upon the upper end of the standard there is mounted a cord guide pulley, 8, and a rearwardly projecting horizontal arm, 9, rigid with the standard, carries a second pulley, 10, which is preferably positioned a little above the lower end of the depending arm on the bell-crank lever when the latter is in vertical position, and at a distance off from the standard sufficient to permit the said depending arm of the bell-crank lever to swing clear of it.

The fisherman's line, 15, is designed to be fastened to the upper end of the lever, 5, where the eye, 14, is provided for that purpose at a position which is above the shaft of the guide pulley, 8, when the lever is at locked position; and the lower end of the depending arm of the bell-crank lever has an offset, 7ᵈ, whose edge toward the standard has a notch, 7ᵉ, for engagement of the line, which is passed above the pulley, 8, and down into the said notch and thence out over the guide pulley, 10, to the hook or bait. The lever, 5, being engaged with the latch, and the line positioned as described, a slight pull on the line, it will be seen, operates to draw the lower end of the depending arm of the bell-crank lever toward the pulley, 10, releasing the latch from the lever, 5, whereupon the spring, 6, retracts the lever down toward horizontal position, jerking the line connected to its upper end for operating the hook to catch the fish. Preferably some form of alarm device, as a hammer for a gong, or the bell, 13, is attached to the lever, 5, so that the attendant may be signaled when the device is sprung. As illustrated, the bell, or gong hammer, 13, is carried on the end of a stem, 12, which is coiled to form the eye, 14, above mentioned, to which the line is attached.

The structure adopted as above described is adapted for very economical manufacture, because all of the parts can be made of ordinary strap metal and riveted together in the simplest manner.

We claim:—

1. An automatic fish catcher comprising a standard; a line-jerking lever fulcrumed on the standard and adapted for attachment of the fisherman's line; a spring for retracting the lever; a detent for locking it against such retraction; two guides on the standard to which the line runs from the lever, the detent having an arm which swings toward a direct line from guide to guide in the lever-releasing action of the detent, such arm being adapted for engagement of the line intermediate the guides.

2. An automatic fish catcher, comprising a standard and means for securing it; a line-jerking lever fulcrumed on the standard adapted for attachment of the fisherman's line; a spring for retracting the lever for so actuating the line; a detent for locking the lever against such retraction; two cord guides carried by the standard, the detent being a bell-crank, one arm engaging the line-jerking lever, the other arm extending in position offset from the direct line from cord-guide to cord-guide, the movement of said arm moving in the lever-releasing action of the detent being toward said direct line, and the arm being adapted for engagement of the cord to deflect it out of such direct line between the guides.

3. An automatic fish catcher, comprising an L-shaped, or angular standard, having a horizontal member provided with a tang for engaging a support; a line-jerking lever fulcrumed on the standard; a contractile spring connected to said lever and to the horizontal arm of the standard at a point remote from the angle for retracting a lever downward toward horizontal position; a detent pivoted on the upstanding arm of the standard for engaging the lever to lock it at erect position; a cord guide at the top of the standard; an arm projecting off from the standard in the opposite direction from the downward swinging movement of the lever, and a second cord guide on said arm, the detent being a bell crank having an arm which at locking position of the detent depends from its fulcrum at the side toward the standard of a direct line from cord-guide to cord-guide, for engagement of the fisherman's line to deflect it from said direct line intermediate the cord guides.

4. An automatic fish-catcher comprising a line-jerking lever to which the line is attached, two fixed guides over which successively the line runs from the lever to the hook, a detent for locking the lever and a spring for retracting it from locked, position, the detent having an arm provided with a cord guide positioned for receiving the cord between the first mentioned guides and which at the lever-locking position of the detent is out of line with said first mentioned cord guides, and which moves toward said line for releasing the lever.

In testimony whereof, we have hereunto set our hands, at Chicago, Illinois, this 14th day of October, 1909.

FREDERICK BECKER.
JOHN E. POGGENSEE.

Witnesses:
   LUCY A. FALKENBERG,
   M. GERTRUDE ADY.